(12) United States Patent
Dagner et al.

(10) Patent No.: US 12,370,913 B2
(45) Date of Patent: Jul. 29, 2025

(54) SOIL PROCESSING MACHINE

(71) Applicant: Hamm AG, Tirschenreuth (DE)

(72) Inventors: Josef Dagner, Altenstadt (DE); Stefan Braunschläger, Bärnau (DE); Michael Sperber, Waldsassen (DE); Stefan Bäuml, Tirschenreuth (DE)

(73) Assignee: Hamm AG, Tirschenreuth (DE)

( * ) Notice: Subject to any disclaimer, the term of this patent is extended or adjusted under 35 U.S.C. 154(b) by 373 days.

(21) Appl. No.: 17/962,673

(22) Filed: Oct. 10, 2022

(65) Prior Publication Data

US 2023/0113182 A1    Apr. 13, 2023

(30) Foreign Application Priority Data

Oct. 12, 2021    (DE) .................. 10 2021 126 365.4

(51) Int. Cl.
*B60L 53/20*       (2019.01)
*B60L 53/16*       (2019.01)
(Continued)

(52) U.S. Cl.
CPC ............ *B60L 53/20* (2019.02); *B60L 53/16* (2019.02); *H01M 10/4257* (2013.01); *H01M 10/46* (2013.01); *H01M 50/249* (2021.01); *H02J 7/0045* (2013.01); *H02J 7/0068* (2013.01); *B60L 50/60* (2019.02); *B60L 2200/40* (2013.01);
(Continued)

(58) Field of Classification Search
CPC .......... B60L 53/20; B60L 53/16; B60L 50/60; B60L 2200/40; B60L 53/14; B60L 53/22; H01M 10/4257; H01M 10/46; H01M 50/249; H01M 2010/4271; H01M 2220/20; H02J 7/0045; H02J 7/0068; E01C 19/26
See application file for complete search history.

(56) References Cited

U.S. PATENT DOCUMENTS 9,925,887 B2 *   3/2018  McGrath .................. B60L 53/55
10,471,838 B2 *  11/2019  Rajaie ...................... B60L 53/16
(Continued)

FOREIGN PATENT DOCUMENTS

CA      3154409 A1 *  4/2021  ........... A01D 34/006
CN     110048276 A     7/2019
(Continued)

OTHER PUBLICATIONS

GB-2443272-A English Translation (Year: 2008).*
(Continued)

*Primary Examiner* — James A Shriver, II
*Assistant Examiner* — Michael T. Walsh
(74) *Attorney, Agent, or Firm* — Rankin, Hill & Clark LLP

(57) ABSTRACT

A soil processing machine, in particular a soil compactor, comprising at least one battery (28) supported on a machine frame (24) and at least one consumer of electrical energy (30) fed from the at least one battery (28), further comprising at least one interchangeable charging module (32) which is detachably supported on the machine frame (24), has a battery connection region (95) for connecting the at least one interchangeable charging module (32) to a battery management system (34), and has a voltage supply connection region (84) for connecting the at least one interchangeable charging module (32) to an external voltage source.

17 Claims, 4 Drawing Sheets

(51) Int. Cl.
 *H01M 10/42* (2006.01)
 *H01M 10/46* (2006.01)
 *H01M 50/249* (2021.01)
 *H02J 7/00* (2006.01)
 *B60L 50/60* (2019.01)

(52) U.S. Cl.
 CPC .............. *H01M 2010/4271* (2013.01); *H01M 2220/20* (2013.01)

(56) References Cited

U.S. PATENT DOCUMENTS

| | | | | |
|---|---|---|---|---|
| 2020/0139831 | A1* | 5/2020 | Ichikawa | ................ B60L 53/18 |
| 2020/0376970 | A1* | 12/2020 | Berggren | ................ B60L 3/003 |

FOREIGN PATENT DOCUMENTS

| | | | | |
|---|---|---|---|---|
| CN | 216611357 | | 5/2022 | |
| DE | 102017101693 | | 8/2018 | |
| DE | 102019002439 | A1 * | 10/2020 | ............ B60K 16/00 |
| DE | 102020115487 | A1 * | 12/2021 | ............ B60L 53/11 |
| DE | 102020207506 | | 12/2021 | |
| DE | 102020133340 | A1 * | 6/2022 | ............... B60K 6/20 |
| EP | 1215111 | A1 * | 6/2002 | ............... B60K 1/04 |
| GB | 2443272 | | 4/2008 | |
| GB | 2443272 | A * | 4/2008 | ............... B60K 1/04 |
| JP | 2007295728 | | 11/2007 | |
| JP | 2007295728 | A * | 11/2007 | |
| JP | 2009097270 | | 5/2009 | |
| JP | 2011136626 | A * | 7/2011 | |
| JP | 2020078153 | | 5/2020 | |
| KR | 20240023761 | A * | 8/2022 | |

OTHER PUBLICATIONS

JP-2007295728-A English Translation (Year: 2007).*
DE-102019002439-A1 English Translation (Year: 2020).*
DE-102020133340-A1 English Translation (Year: 2022).*
CA-3154409-A1 English Translation (Year: 2021).*
DE-102020115487-A1 English Translation (Year: 2021).*
KR-20240023761-A English Translation (Year: 2022).*
EP-1215111-A1 English Translation (Year: 2002).*
JP-2011136626-A English Translation (Year: 2011).*
German Search Report for German application No. DE 10 2021 126 365.4 dated Aug. 1, 2022, 10 pages (German).

* cited by examiner

SOIL PROCESSING MACHINE

The present invention relates to a soil processing machine, such as a soil compactor, in which at least one battery is supported on a machine frame in order to feed one or a plurality of electrical energy consumers provided on such a soil processing machine.

In conventionally driven soil processing machines, in which the energy required for the operation of the same is provided by a drive unit designed as an internal combustion engine, the electrical energy consumers provided on the soil processing machines can be fed from a battery via an on-board power supply system during operation of the soil processing machines. The battery can be charged via a generator coupled to the drive unit. A connection to an external voltage source for charging such a battery is basically not necessary.

Due to the transition to electrically operated soil processing machines, in which the energy for operating them is provided by electric motors powered by one or more batteries, it is necessary to create an interface through which the batteries of such soil processing machines can be recharged when they have been fully or partially discharged in operation.

It is the object of the present invention to provide a soil processing machine, in particular a soil compactor, which has a variable connection to an external energy source for charging one or more batteries.

According to the invention, this object is achieved by a soil processing machine, in particular a soil compactor, according to claim 1. This soil processing machine comprises at least one battery supported on a machine frame and at least one consumer of electrical energy fed from said at least one battery.

The soil processing machine further comprises at least one interchangeable charging module that is detachably supported on the machine frame and has a battery connection region for connecting the at least one interchangeable charging module to a battery management system and with a voltage supply connection region for connecting the at least one interchangeable charging module to an external voltage source.

In a soil processing machine constructed according to the invention, the charging module providing an interface between one or more batteries or a battery management system and an external voltage source for charging the batteries is not permanently installed as an interchangeable charging module on the soil processing machine, but is detachably coupled to it. This means that the interchangeable charging module can, for example, only be provided for carrying out a charging process on a soil processing machine, but can be removed from the soil processing machine after one or more batteries have been fully charged and can be used, for example, to carry out a charging process on another soil processing machine to perform. A single interchangeable charging module can thus be used in connection with a plurality of soil processing machines, and it is not necessary to keep separate loading modules available for a plurality of soil processing machines provided at a construction site.

For the stable, but nevertheless easily detachable coupling of an interchangeable charging module to a soil processing machine, the at least one interchangeable charging module can be detachably supported on the machine frame by means of a suspension arrangement, the suspension arrangement comprising:

- a vertical support region on the at least one interchangeable charging module and a vertical counter-support region on the machine frame for substantially vertical support of the at least one interchangeable charging module with respect to the machine frame,
- a horizontal support region on the at least one interchangeable charging module and a horizontal counter-support region on the machine frame for substantially horizontal support of the at least one interchangeable charging module with respect to the machine frame.

A defined positioning of the at least one interchangeable charging module can be ensured in that the vertical counter-support region comprises at least one vertical engagement element with a vertical engagement recess, and that the vertical support region comprises at least one vertical engagement projection to be positioned engaging in the at least one vertical engagement recess.

In order to maintain, using gravity, the state of engagement between a vertical engagement projection and a vertical engagement recess that is receiving it, the at least one vertical engagement recess can be open substantially in the upward direction.

The vertical engagement element can also be constructed with electrically insulating material for a high level of operational safety, especially taking into account the high electrical voltages generally required for carrying out a charging process or the strong electrical currents flowing during a charging process.

A defined positioning of the at least one interchangeable charging module can be supported in that the horizontal counter-support region comprises at least one horizontal engagement element with a horizontal engagement recess, and that the horizontal support region comprises at least one horizontal engagement projection to be positioned engaging in the at least one horizontal engagement recess. In an alternative embodiment, the horizontal counter-support region can comprise at least one horizontal engagement element with a horizontal support surface, and the horizontal support region can comprise at least one horizontal support region that can be supported on the horizontal support surface.

Here, too, the action of gravity can be used for cohesion if the at least one horizontal engagement recess is essentially open in the lateral direction, i.e., for example, essentially transversely to the opening direction of the vertical engagement recess.

For a high level of operational reliability, the horizontal engagement element is preferably also constructed with electrically insulating material.

If the vertical counter-support region and the horizontal counter-support region in at least one interchangeable charging module supported on the machine frame are offset in the horizontal direction to a center of mass of the at least one interchangeable charging module and are arranged on the same side with respect to the center of mass, it is ensured under the action of gravity alone that in particular the horizontal support region and the horizontal counter-support region are prestressed in supporting interaction with one another.

The at least one interchangeable charging module can comprise an essentially plate-like charging device carrier, constructed for example as a formed sheet metal part, and at least one charging device fixed to the charging device carrier. In this case, the charging device carrier can provide the vertical support region and the horizontal support region.

In order to avoid unintentional movements of the interchangeable charging module, particularly when the interchangeable charging module is to remain on the machine frame while a work process is being carried out, a locking arrangement can be provided for locking the at least one interchangeable charging module with respect to the machine frame.

In order to be able to generate the locking interaction, the locking arrangement can comprise at least one locking element arranged on the at least one interchangeable charging module and, assigned to each locking element, a counter-locking element fixed on the machine frame, with the installation and detachment of an interchangeable charging module then being particularly simple can be carried out if each locking element can be brought into locking engagement with an associated counter-locking element by latching.

At least one handle can be provided on the at least one interchangeable charging module for easy handling or easy transport.

A frame cover that can be moved between an open position and a closed position and is designed, for example, like a hood can be supported on the machine frame. In order to ensure that the soil processing machine is not started up unintentionally when it is connected to an external voltage source, it is preferably provided that the frame cover is not in the closed position when at least one interchangeable charging module is connected to an external voltage source in its voltage supply connection region is positionable. In general, it can be assumed that an operator will not operate a soil processing machine if the frame cover is not in its closed position. Preventing this closed position from being assumed when the soil processing machine or an interchangeable charging module is connected to an external voltage source thus increases security against unintentional start-up in such a state.

The at least one consumer of electrical energy fed from the at least one battery can include, for example:
an on-board voltage system,
and/or
an electrohydraulic operating system, for example with at least one hydraulic pump to be driven by an electric motor and at least one hydraulic motor fed by the at least one hydraulic pump,
and/or
an electrical operating system with at least one drive train to be driven by at least one electric motor.

The variability in use can be further increased by providing at least two charging devices of different designs on at least one interchangeable charging module. By providing chargers of different types on one and the same interchangeable charging module, this can be used in connection with soil processing machines of different types, in particular with different batteries, which require different charging processes, for example different charging currents or charging voltages.

The present invention is described in detail below with reference to the drawings attached. In the drawings.

Figure 1:
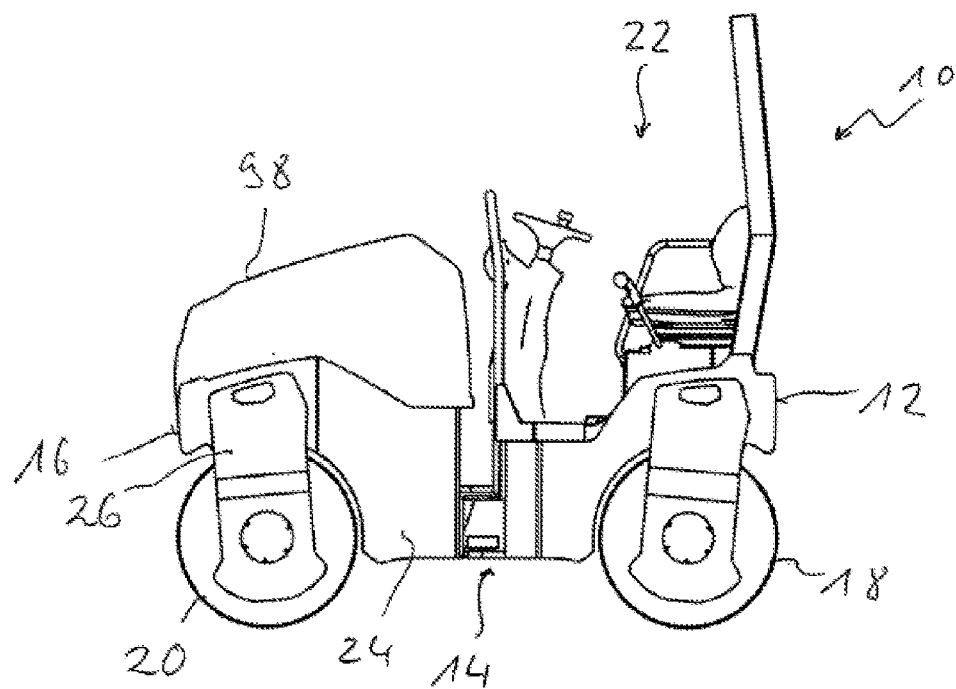
FIG. 1 shows a side view of a soil processing machine designed as a soil compactor.
Figure 2:
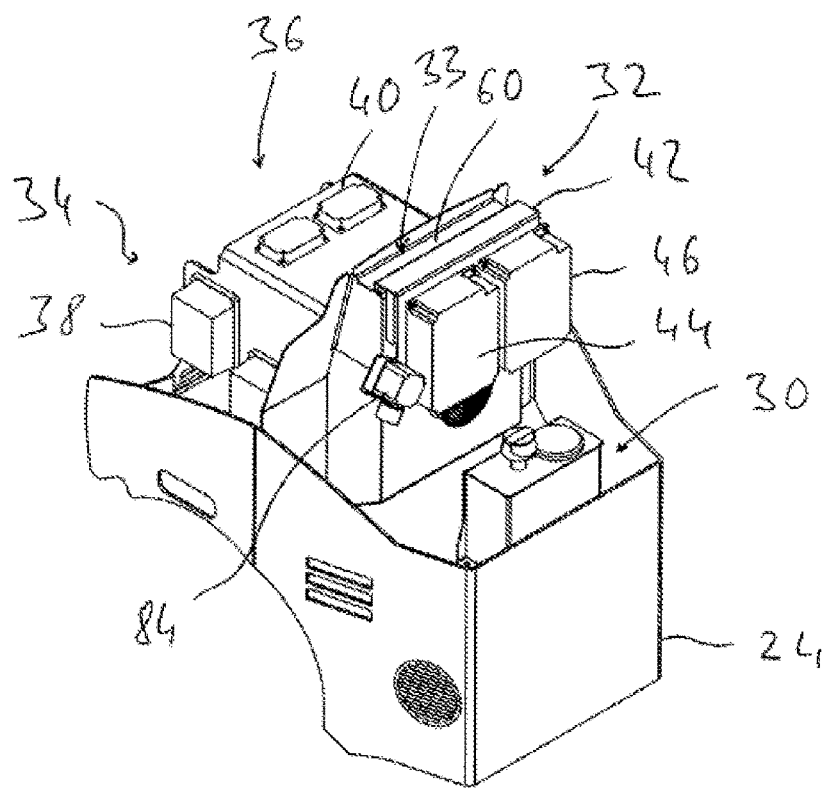
FIG. 2 shows a perspective view of a part of a machine frame of a front carriage of the soil compactor shown in FIG. 1.

In FIG. 1, a soil processing machine designed as a soil compactor is generally designated by the reference numeral 10. The soil processing machine 10 comprises a rear carriage 12 and a front carriage 16 which is pivotably connected to the rear carriage 12 in an articulation region 14 for steering the soil processing machine 10. A tillage roller 18 is rotatably supported on the rear carriage 12. A tillage roller 20 is rotatably supported on the front carriage 16. Also provided on the rear carriage 14 is a control station 22 for an operator, from which an operator can start and operate the soil processing machine 10, for example to carry out a compaction process.

The front carriage 16 of the soil processing machine 10 comprises a machine frame, generally designated by the reference numeral 24. The machine frame 24 can be composed of a large number of individual components which can be connected to one another by, for example welding and/or screwing or in any other way. The tillage roller 20 provided on the front carriage 16 is rotatably supported on the machine frame 24 via a bracket-like roller carrier 26 which likewise provides a part of the machine frame 24.

Figure 3:
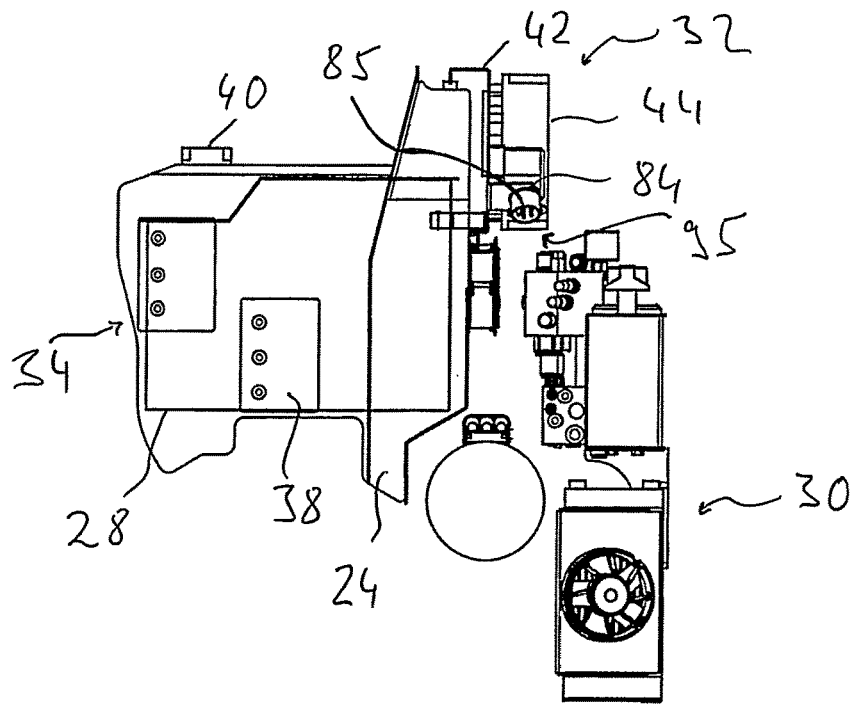
FIG. 3 shows a side view of a part of the machine frame of the front carriage of the soil processing machine shown in FIG. 1 with components of an electrohydraulic operating system of the soil processing machine.

The soil processing machine 10 shown in FIG. 1 is basically an electrically operated soil processing machine. This means that the energy for operating the soil processing machine 10 is not supplied by a drive unit driven as an internal combustion engine, but by a large number of consumers of electrical energy fed from a battery 28 shown in principle in FIG. 3. These consumers of electrical energy can include, for example, an on-board power supply system of the soil processing machine 10, via which, for example, lighting, control devices and the like are supplied with electrical energy. An electrohydraulic operating system 30 of the soil processing machine 10 shown in principle in FIG. 3 also forms such a consumer of electrical energy. The electrohydraulic operating system 30 can include, for example, an electrohydraulic traction drive system with a traction hydraulic pump driven by an electric motor and, in association with each tillage roller 18, 20, a traction hydraulic motor fed with pressurized fluid by the traction hydraulic pump. The electrohydraulic operating system 30 may further include an electrohydraulic steering system in which a steering hydraulic pump driven by an electric motor is provided with pressurized fluid fed into a steering unit for pivoting the front carriage 16 with respect to the rear carriage 12.

In order to charge the battery 28 and to discharge it during working operation to feed the various consumers of electrical energy, an interchangeable charging module 32, described in more detail below, and a battery management system, generally designated by the reference numeral 34, are provided. The interchangeable charging module 32 provides an interface between the battery management system 34 and an external voltage source. By virtue of the battery management system 34 which may include a variety of power electronics system areas 36 such as inverters 38 and DC/DC converters 40, the battery 38 is suitably charged with a charging voltage during the charging process, and the battery is charged during working operation, converting the operating voltage provided by it into an on-board power supply voltage and a 3-phase voltage required for the operation of the electric motor explained above. It should be pointed out that such a battery management system 34 or, in general, the power electronics of the soil processing machine 10 or also the on-board power supply system can include a large number of other components or system areas that are not shown in the figures.

Figure 5:
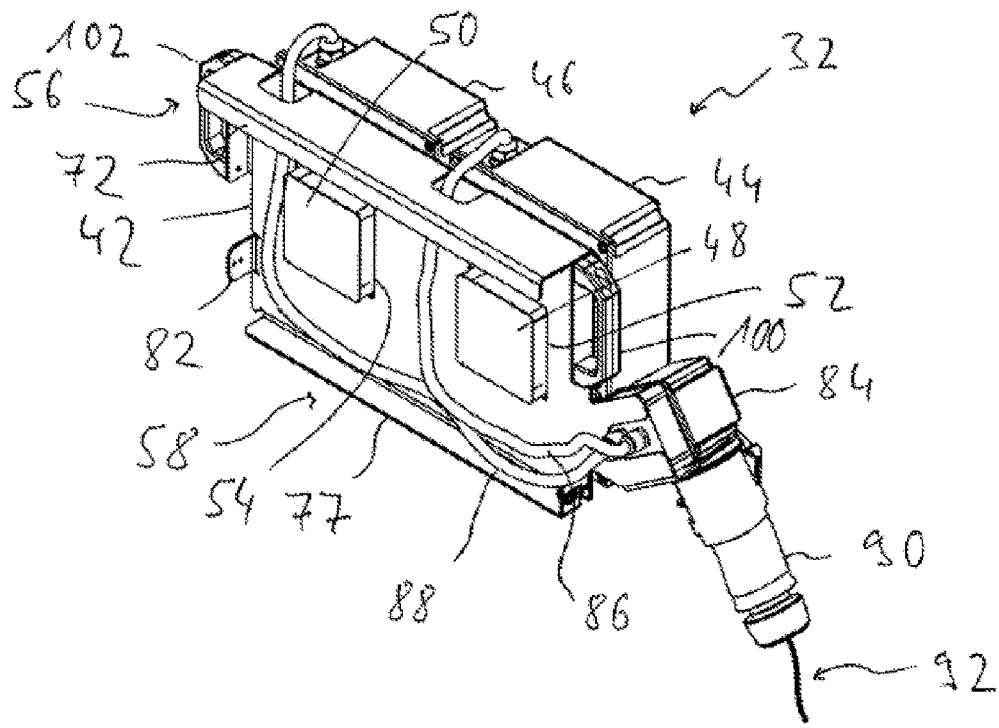
FIG. 5 shows a perspective view of an interchangeable charging module.
Figure 7:
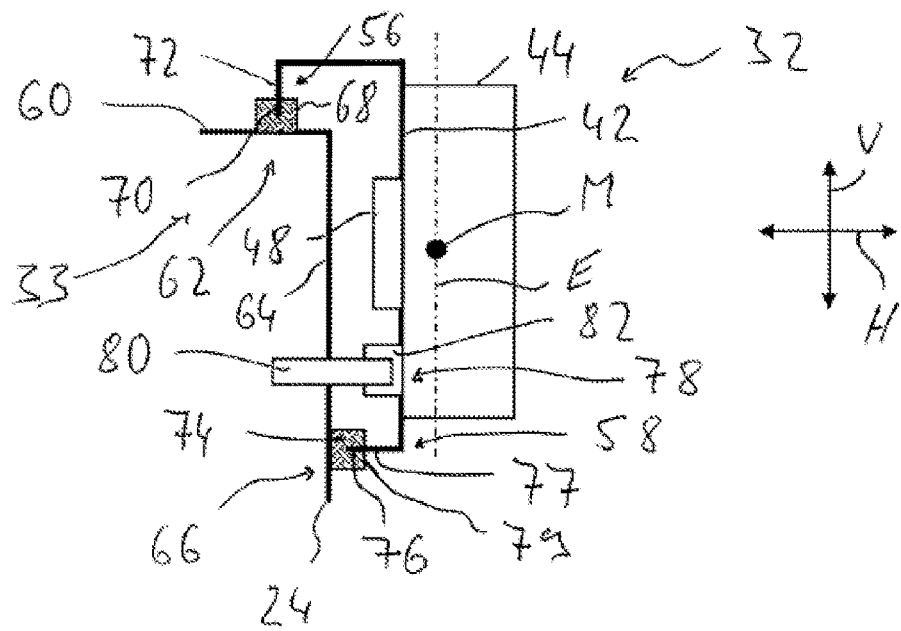
FIG. 7 shows a basic representation to illustrate the detachable attachment of an interchangeable charging module to the machine frame.

The interchangeable charging module 32 shown in FIG. 5 in a perspective view and in FIG. 7 in a schematic side view is not permanently installed in the soil processing machine 10 shown in FIG. 1, but is detachably coupled to it by means of a suspension arrangement 33, so that the interchangeable charging module 32 can be easily removed from or attached to the soil processing machine 10 without major operations. For this purpose, the interchangeable charging module 32 includes a plate-like charging device carrier 42 constructed, for example, as a formed sheet metal part. In the example shown, two chargers 44, 46, which are, for example, identical in construction, are carried next to each other on the charger. FIG. 5 shows that in association with each of the chargers 44, 46 or a fan 48, 50 provided thereon, an opening 52, 54 is provided in the charging device carrier 42, through which a respective fan 48, 50 can extend. The chargers 44, 46 can be firmly connected to the charging device carrier 42, for example by screwing.

When the interchangeable charging module 32 is supported on the machine frame 24 of the front carriage 16, the charging device carrier 42 has in an upper region thereof a vertical support region 56 provided with an edge region bent downwards, ie essentially in a vertical direction V. Likewise, the charging device carrier 42 has a horizontal support region 58 with an edge region lying in a lower region in this state and bent laterally or transversely to the vertical support region 56, ie essentially in a horizontal direction H.

A vertical counter-support region 62 is formed on a substantially horizontally oriented wall 60 of the machine frame 24 in association with the vertical support region 56 of the charging device carrier 52 or the interchangeable charging module 32. Likewise, a horizontal counter-support region 66 is provided on a substantially vertically oriented wall 64 of the machine frame 24 in association with the horizontal support region 58 of the charging device carrier 42 or the interchangeable charging module 32. The interchangeable charging module 32 is supported essentially downwards in the vertical direction V on the vertical counter-support region 62. The interchangeable charging module 32 is supported essentially laterally in the horizontal direction H on the horizontal counter-support region 66, in particular in the direction of the wall 64 of the machine frame 24.

The vertical counter-support region 62 comprises a vertical engagement element 68 fixed to the wall 60 and constructed of electrically insulating material, for example plastic material or ceramic material, with a vertical engagement recess 70 which is essentially open in the vertical direction V upwards. The vertical support region 56 includes a vertical engagement projection 72 provided by the bent edge region of the charging device carrier 42 and positioned to engage the vertical engagement recess 70 in the attached state. The engagement state of the vertical engagement projection 72 with the vertical engagement recess 70 is maintained solely by the action of gravity.

The horizontal counter-support region 66 includes a horizontal engagement member 74 fixed to the wall 64 and constructed of electrically insulating material, such as plastic material or ceramic material, and having a horizontal engagement recess 76 formed therein. The horizontal engagement recess 76 is substantially open laterally away from the wall 64 supporting the horizontal engagement element 74 in the horizontal direction H.

The horizontal support region of the interchangeable charging module 32 comprises a horizontal engagement projection 77 which is provided by the edge region bent essentially in the horizontal direction and which is positioned so as to engage in the horizontal engagement recess 76 in the attached state. In an alternative embodiment, the horizontal engagement element 74 can be configured, for example, without a horizontal engagement recess and can provide a horizontal support surface 79, on which a horizontal support region of the interchangeable charging module 32, which can be configured, for example, like the horizontal engagement projection 77, Can be supported in the horizontal direction H substantially.

FIG. 7 shows that in the attached state, the vertical counter-support region 62 and the horizontal counter-support region 66 and accordingly also the vertical support region 56 or the horizontal support region 58 with respect to a center of mass M of the interchangeable charging module 32 and a point intersecting or intersecting it, for example, containing vertical plane E are offset in the horizontal direction H to the same side. As a result, the mass or weight force acting in the center of gravity M generates a torque around the region of interaction of the vertical engagement projection 72 with the vertical engagement recess 70, which acts clockwise in the illustration in FIG. 7 and the horizontal engagement projection 76 in the horizontal-engagement recess 74 biases. Reliable cohesion of the interchangeable charging module 32 with the machine frame 24 is thus ensured solely by the action of gravity.

Figure 6:
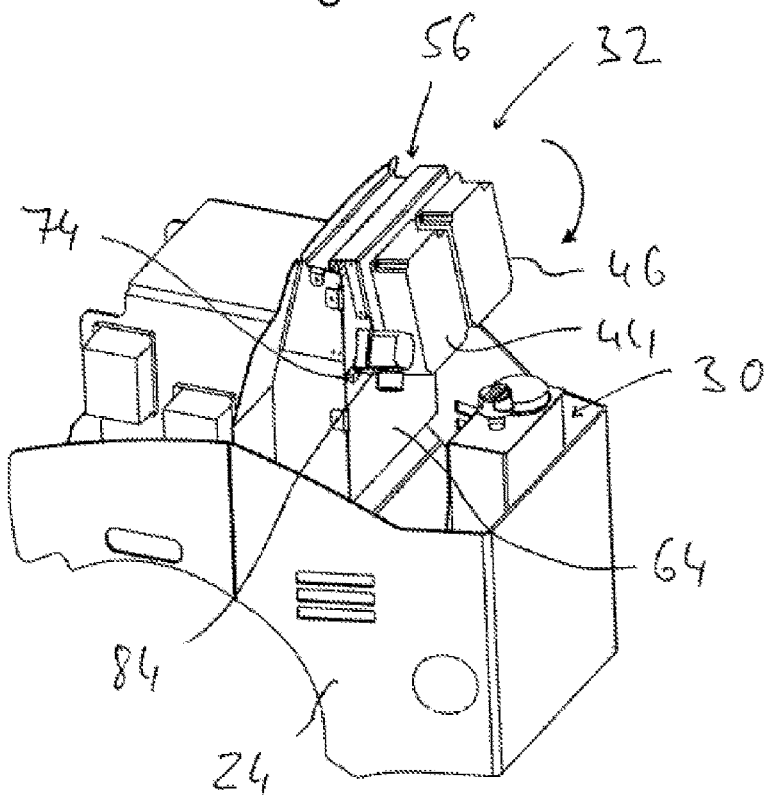
FIG. 6 shows the interchangeable charging module during the process of attaching it to the machine frame of the soil compactor shown in FIG. 1.

In order to avoid movement of the interchangeable charging module 32 in relation to the machine frame 24, particularly when such an interchangeable charging module 32 is to remain on the machine frame 24 or on the soil processing machine 10 during work operation, to support stable cohesion, preferably in a in the horizontal direction H lower region of the interchangeable charging module 32 is provided a locking arrangement generally designated by the reference numeral 78. The locking arrangement 78 comprises a counter-locking element 80 on the machine frame 24, for example on both sides of the interchangeable charging module 32, which is brought into locking engagement with an associated locking element 82 provided on the interchangeable charging module 32 when in the course of one pivoting process illustrated in FIG. 6, the interchangeable charging module 32 is moved with the horizontal engagement projection 77 provided on the charging device carrier 42 towards the horizontal engagement recess 76 or into it. During this process, for example, the counter-locking elements 80 arranged on the machine frame 24 can be deformed laterally until they come into locking engagement with the locking elements 82. When the locking engagement is established, the interchangeable charging module 32 is held reliably on the machine frame 24, also taking into account the vibrations or oscillations that occur during operation.

A voltage supply connection region 84 is provided on the interchangeable charging module 32 in addition to the charging devices 44, 46. This is connected to each of the chargers 44, 46 via connecting cables 86, 88. The voltage supply connection region 84 is designed to accommodate a connection plug 90 of a charging cable, generally designated by the reference numeral 92 at a plug socket 85, via which charging cable the interchangeable charging module 32 can be connected to an external voltage source.

Figure 4:
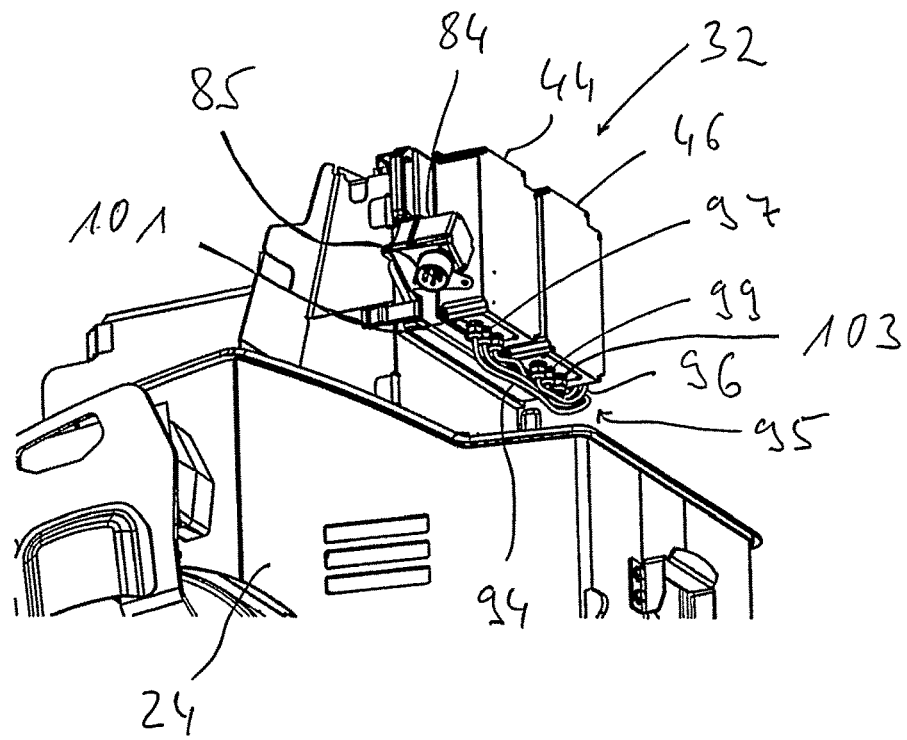
FIG. 4 shows another perspective view of the region of the machine frame that can be seen in FIG. 2.

As illustrated in FIG. 4, the interchangeable charging module 32 or each of the charging devices 44, 46 thereof can be connected to the battery management system 34 via respective line connections 94, 96 in a battery connection region 95. Line connections 94, 96 can, for example, be connected to respective plug sockets 101, 103 of the associated charging device 44, 46 via respective plug-in contacts 97, 99, so that easy detachment of the interchangeable charging module 32 from the battery management system 34 or soil processing machine 10 is also ensured in this region is.

Figure 8:
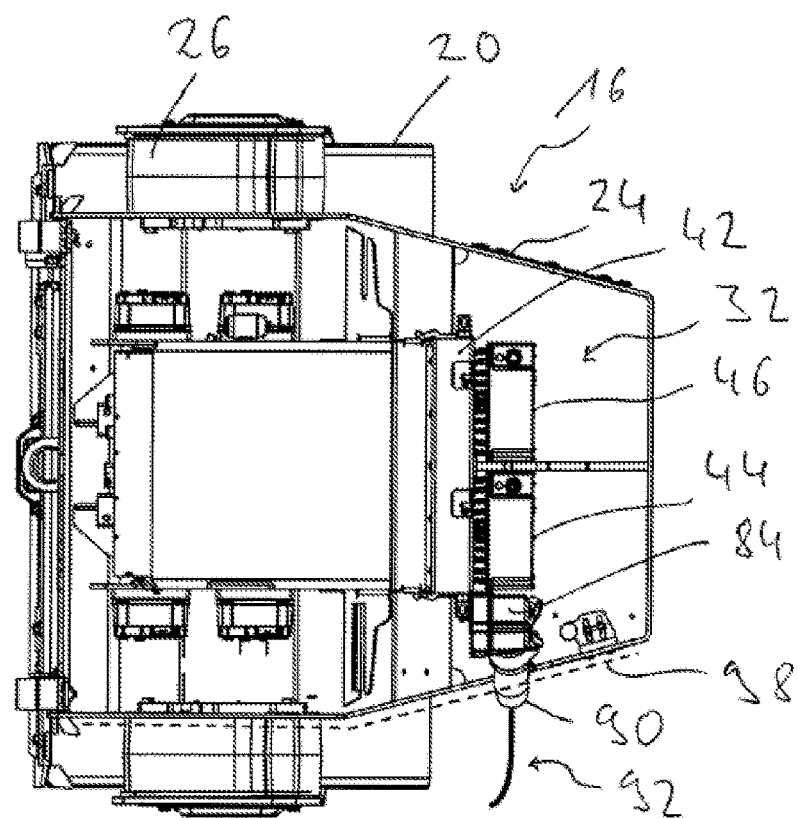
FIG. 8 is a plan view of the front carriage of the soil processing machine shown in FIG. 1 with the frame cover removed from the machine frame.

In FIG. 8 the front carriage 16 of the soil processing machine 10 is shown in plan view. FIG. 8 shows the front carriage 16 without the hood-like frame cover 98 that can be seen in FIG. 1. The frame cover 98 can, for example, be pivotably attached to the front region of the front carriage 16, i.e. to the region that can be seen on the left in FIG. 1, and can be movably carried between the closed position shown in FIG. 1, in which it covers the upper region of the machine frame 24 and thus all system areas provided thereon, in particular also an interchangeable charging module 32 supported on the machine frame 24, and an open position pivoted away from the front. In order to attach or remove an interchangeable charging module 32 to the machine frame 24 or from the machine frame 24, the frame cover 98 is positioned in its open position, so that there is access to the region of the machine frame 24 in which an interchangeable charging module 32 is positioned or is to be positioned.

The contour of the frame cover 98 positioned in the closed position can be seen in the lower region shown in FIG. 8 with a dashed line. It can also be seen that when the charging cable 92 is connected to the voltage supply connection region 84, its connection plug 90 protrudes laterally into that region in which, when the frame cover 98 is in the closed position, it is positioned laterally on the machine frame 24 or overlaps it. This means that when the charging cable 92 is plugged into the power supply connection region 84, the frame cover 98 cannot be moved into its closed position, since this is prevented by the laterally protruding connection plug 90 of the charging cable 92. Thus, a loading process can only be carried out when the frame cover 98 is not in its closed position but is positioned, for example, in its open position. This ensures that the soil processing machine 10 is not put into operation by mistake when the charging cable 92 is connected to the interchangeable charging module 32. The fact that the frame cover 98 cannot be positioned in its closed position is an indication for an operator that a charging cable 92 is connected to the interchangeable charging module 32 and therefore the soil processing machine 10 cannot be put into operation.

The use of an interchangeable charging module that is not permanently installed on the soil processing machine but can be detachably connected to it in a simple manner makes it possible to use one and the same interchangeable charging module to charge the batteries of different soil processing machines. It is not necessary to have a separate loading module for each soil processing machine. This interchangeability of a charging module can then be used in a particularly advantageous manner if, for example, the two or more charging devices provided on it have different designs from one another and can therefore be used to charge different batteries. One and the same interchangeable charging module can then be used in connection with different types of soil processing machines or in connection with different batteries.

In order to be able to easily change the interchangeable charging module 32, it can have handles 100, 102 on both sides of the charging device carrier 42, for example, which allow an operator to securely grip such an interchangeable charging module 32 and to position it on or remove from the machine frame 24 in the manner described above.

Finally, it should be pointed out that in the design of a soil processing machine or an interchangeable charging module according to the invention, the system areas of the suspension arrangement described above are designed in a particularly advantageous manner such that they act in a vertical direction V and a horizontal direction H or interact with one another, which correspond to a vertical or horizontal line in an earth coordinate system when the soil processing machine is standing on a horizontal surface. However, the invention can nevertheless be embodied in a design in which the vertical direction V does not correspond exactly to the vertical in an earth coordinate system, but defines a direction which essentially corresponds to an up-down direction and, for example, is closer to the vertical than to the horizontal. The horizontal direction H could also deviate from the horizontal in an earth coordinate system, but for example be closer to the horizontal than to the vertical.

The invention claimed is:

1. A soil processing machine, comprising at least one battery supported on a machine frame and at least one consumer of electrical energy fed from the at least one battery, further comprising at least one interchangeable charging module, detachably supported on the machine frame, with a battery connection region for connecting the at least one interchangeable charging module to a battery management system and with a voltage supply connection region for connecting the at least one interchangeable charging module to an external voltage source, wherein the at least one interchangeable charging module comprises a charging device carrier and at least one charging device fixed to the charging device carrier.

2. The soil processing machine of claim 1,
wherein the at least one interchangeable charging module is detachably carried by means of a suspension arrangement on the machine frame, the suspension arrangement comprising:
a vertical support region on the at least one interchangeable charging module and a vertical counter-support region on the machine frame for substantially vertical support of the at least one interchangeable charging module with respect to the machine frame, and
a horizontal support region on the at least one interchangeable charging module and a horizontal counter-support region on the machine frame for substantially horizontal support of the at least one interchangeable charging module with respect to the machine frame.

3. The soil processing machine of claim 2,
wherein the vertical counter-support region comprises at least one vertical engagement element with a vertical engagement recess, and in that the vertical support region comprises at least one vertical engagement projection to be positioned in an engaging manner in the at least one vertical engagement recess.

4. The soil processing machine of claim 3,
wherein the at least one vertical engagement recess is open in an upward direction, and/or that the vertical engagement element is constructed with electrically insulating material.

5. The soil processing machine of claim 2,
wherein the horizontal counter-support region comprises at least one horizontal engagement element with a horizontal engagement recess, and in that the horizontal support region comprises at least one horizontal engagement projection to be positioned in an engaging manner in the horizontal engagement recess, or in that the horizontal counter-support region comprises at least one horizontal engagement element with a horizontal support surface, and in that the horizontal support region comprises at least one horizontal support region that is able to be supported on the horizontal support surface.

6. The soil processing machine of claim 5,
wherein the at least one horizontal engagement recess is open at the side, and/or in that the horizontal engaging element is constructed with electrically insulating material.

7. The soil processing machine of claim 2,
wherein with at least one interchangeable charging module supported on the machine frame, the vertical counter-support region and the horizontal counter-support region, in a horizontal direction to a center of mass of the at least one interchangeable charging module, are offset and arranged on a same side with respect to the center of mass.

8. The soil processing machine of claim 1,
wherein the charging device carrier has a substantially plate-like configuration.

9. The soil processing machine of claim 1,
wherein the at least one interchangeable charging module is detachably carried by means of a suspension arrangement on the machine frame, the suspension arrangement comprising:
   a vertical support region on the at least one interchangeable charging module and a vertical counter-support region on the machine frame for substantially vertical support of the at least one interchangeable charging module with respect to the machine frame, and
   a horizontal support region on the at least one interchangeable charging module and a horizontal counter-support region on the machine frame for substantially horizontal support of the at least one interchangeable charging module with respect to the machine frame,
   wherein the charging device carrier provides the vertical support region and the horizontal support region.

10. The soil processing machine of claim 1,
wherein a locking arrangement is provided for locking the at least one interchangeable charging module with respect to the machine frame.

11. The soil processing machine of claim 10,
wherein the locking arrangement comprises at least one locking element arranged on the at least one interchangeable charging module and, in association with each locking element, a counter-locking element fixed to the machine frame.

12. The soil processing machine of claim 11,
wherein each locking element is lockable into locking engagement with an associated counter-locking element by latching.

13. The soil processing machine of claim 1,
wherein at least one handle is provided on the at least one interchangeable charging module.

14. The soil processing machine of claim 1,
wherein a frame cover movable between an open position and a closed position is supported on the machine frame, and in that, with at least one interchangeable charging module connected to an external voltage source in its voltage supply connection region, the frame cover cannot be positioned in the closed position.

15. The soil processing machine of claim 1,
wherein the at least one consumer of electrical energy fed from the at least one battery comprises:
   an on-board voltage system,
   and/or
   an electrohydraulic operating system, optionally with at least one hydraulic pump to be driven by an electric motor and at least one hydraulic motor fed by the at least one hydraulic pump,
   and/or
   an electrical operating system with at least one drive train to be driven by at least one electric motor.

16. The soil processing machine of claim 1,
wherein at least two charging devices of different types are provided on at least one interchangeable charging module.

17. A soil processing machine, comprising at least one battery supported on a machine frame and at least one consumer of electrical energy fed from the at least one battery, further comprising at least one interchangeable charging module, detachably supported on the machine frame, with a battery connection region for connecting the at least one interchangeable charging module to a battery management system and with a voltage supply connection region for connecting the at least one interchangeable charging module to an external voltage source, wherein the at least one interchangeable charging module is detachably carried by means of a suspension arrangement on the machine frame, the suspension arrangement comprising:
   a vertical support region on the at least one interchangeable charging module and a vertical counter-support region on the machine frame for substantially vertical support of the at least one interchangeable charging module with respect to the machine frame, and
   a horizontal support region on the at least one interchangeable charging module and a horizontal counter-support region on the machine frame for substantially horizontal support of the at least one interchangeable charging module with respect to the machine frame.

\* \* \* \* \*